United States Patent [19]

Yang

[11] Patent Number: 5,317,055
[45] Date of Patent: May 31, 1994

[54] INTERNAL RESIN-TACKIFIED ACRYLIC POLYMERS

[75] Inventor: Henry W. Yang, Kingwood, Tex.

[73] Assignee: Exxon Chemical Patents Inc., Linden, N.J.

[21] Appl. No.: 935,482

[22] Filed: Aug. 25, 1992

Related U.S. Application Data

[60] Division of Ser. No. 631,612, Dec. 20, 1990, Pat. No. 5,164,441, which is a continuation-in-part of Ser. No. 360,507, Jun. 2, 1989, abandoned, and a continuation-in-part of Ser. No. 526,863, May 21, 1990, Pat. No. 5,095,065.

[51] Int. Cl.$^5$ ............................................. C09J 107/02
[52] U.S. Cl. .................................... 524/458; 524/481; 524/484; 524/490; 524/460
[58] Field of Search ............... 524/458, 481, 484, 490, 524/460

[56] References Cited

FOREIGN PATENT DOCUMENTS 51-125472 11/1976 Japan .

Primary Examiner—Joseph L. Schofer
Assistant Examiner—Jeffrey T. Smith
Attorney, Agent, or Firm—M. B. Kurtzman; C. L. Bell

[57] ABSTRACT

Acrylic copolymer PSA compositions having enhanced peel strength without substantially decreasing shear properties have been formulated by homogeneously incorporating the tackifying resin into the polymer matrix. The tackifying resin is dissolved into a solution of alkyl (meth) acrylate and (meth) acrylic acid monomers prior to polymerization. To enhance the molecular weight of the resultant PSA, the monomer/tackifier solution is emulsion polymerized in the absence of chain transfer agents, such as antioxidant additives typically found in commercially available tackifiers, and allylic hydrogen present in many unsuitable tackifiers.

8 Claims, No Drawings

INTERNAL RESIN-TACKIFIED ACRYLIC POLYMERS

This is a division of application Ser. No. 631,612, filed Dec. 20, 1990 now U.S. Pat. No. 5,164,441 which is a continuation-in-part of my earlier copending application Ser. No. 360,507, filed Jun. 2, 1989 now abandoned, and copending application Ser. No. 526,863, filed May 21, 1990 now U.S. Pat. No. 5,095,065.

FIELD OF THE INVENTION

This invention relates to acrylic copolymer compositions and more particularly to pressure sensitive adhesive (PSA) compositions homogeneously incorporating a tackifying resin essentially free of chain transfer agents into the copolymer matrix.

BACKGROUND OF THE INVENTION

According to the "Glossary of Terms used in the Pressure Sensitive Tape Industry", a pressure sensitive adhesive (PSA) is a material which is aggressively and permanently tacky, adheres without the need of more than finger pressure, exerts a strong holding force, and has sufficient cohesiveness and elasticity that it can be removed from substrates without leaving a residue. Tackified acrylic copolymers are used as PSAs. Such tackified copolymers have usually been prepared by physically mixing a tackifying petroleum-based hydrocarbon resin or a natural resin with a polymerized acrylic copolymer. While the resulting adhesive is often satisfactory to obtain certain properties such as tackiness and peel strength on substrates such as polyester or stainless steel, certain properties are found to be deficient, particularly the holding power on these same substrates. Previously, increasing the peel strength of tackified acrylic copolymers to a value greater than 2.0 pounds per inch caused the holding power (1 kg over one inch square on stainless steel) to diminish to below 40 hours. Of course, it is desirable to maintain high holding power, particularly when the PSA is to be used to prepare an adhesive tape.

The prior art describes attempts to prepare satisfactory tackified acrylic copolymers. For example, Japanese Patent J-59213783 teaches the preparation of a hot-melt PSA by first heating a tackifying resin having a softening point between 60° and 200° C. to above its melting point and adding to the hot melt a polymerization mixture of alkyl (meth) acrylate, a functional monomer such as acrylic acid, and a free radical initiator. The polymerization mixture is added to the hot-melt over a period of several hours, with stirring, to form a pale yellow, transparent, solid, hot-melt adhesive. The tackifying resins are broadly identified to include rosin-based resins, terpene-phenol resins, phenol resins, coumarone resins, aliphatic and aromatic resins.

Japanese Patent J-59227967 discloses a hot-melt polymerization of an alkyl (meth) acrylate monomer and a functional comonomer including (meth) acrylic acid, maleic anhydride, maleic acid, vinyl ethers, and the like where a surfactant is present with the resin during the polymerization to form a solid mass, hot-melt adhesive.

In Japanese Patent 53074041 a polymerized powdery toner product is obtained by dissolving a binder resin such as a vinyl resin, acetal resin, epoxy resin, or the like in a polymerizable liquid monomer such as styrene, vinyl toluene, (meth) acrylic acid or its ester and the like and polymerizing the monomers in bulk in the presence of a coloring material.

In Japanese Patent J-51125472, a petroleum resin emulsion is obtained by polymerizing vinyl monomers in the presence of petroleum resins having softening points of from 40° to 160° C., an average molecular weight of 300 to 3000, and an acid value and saponification value of less than 1. The monomers include, for example, alkyl (meth) acrylates, vinyl acetates and vinyl chlorides, styrene, acrylonitrile, and acrylic acid. The emulsified mixture is then reacted in an emulsion polymerization reaction to form a shelf-stable emulsion adhesive. The resin emulsion produced is described as having fine particle sizes and ample stability and when cured, the films produced have excellent water resistance and gloss. Also, U.S. Pat. No. 4,645,711 to Winslow et al. describes the incorporation of hydrocarbon resins from many sources, i.e., from hydrogenated resin esters, polyterpene, polymerized alkyl styrene, and polymerized petroleum-derived monomer resins, into PSA tape compositions where the adhesive is a polymerized acrylic emulsion. The patent describes physically mixing the resin with the polymer emulsion.

Numerous approaches have been used to produce resin emulsions. One approach is to dissolve the resin in a hydrocarbon solvent, combine the resin solution and water to form an emulsion, and strip the solvent. Invariably some residual hydrocarbon solvent remains in the finished emulsion which is undesirable in certain applications. This has led to the development of solvent-free dispersions (see U.S. Pat. No. 2,809,948) and emulsions (see U.S. Pat. No. 3,377,298) of petroleum resins. In both of these formulations, ionic emulsifiers have been utilized; in the former a mixture of cationic and nonionic surface active agents is used to achieve a resin emulsion; and in the latter an ionic surfactant is used in combination with an aqueous gel of a swelling earth to produce an emulsion paste of a petroleum resin. These resin emulsions have been commercially used to tackify natural rubber, carboxylated styrene-butadiene and acrylic latexes for many adhesive applications.

As mentioned above, there has generally been a decrease in shear properties associated with an increase of peel strength and tackiness. There is a need to improve the peel strength of PSAs while yet maintaining high shear properties and thus obviating the decline in shear usually resulting from increase in peel.

Accordingly, it is an object of this invention to prepare a resin tackified acrylic copolymer in the form of a latex-like dispersion for application as PSAs having increased peel strength without serious decrease in shear.

It is a further object to provide a process for preparing a resin tackified acrylic copolymer, wherein the tackifying resin is dissolved in the acrylic monomer solution prior to the polymerization reaction, and wherein the tackifying resin is essentially free of chain transfer agents such as allylic hydrogen and conventional antioxidants.

It is still a further object of this invention to provide PSAs for the manufacture of tapes and adhesives for the manufacture of laminant articles.

SUMMARY OF THE INVENTION

A tackified acrylic copolymer latex composition incorporating a homogeneous matrix of a hydrogenated natural resin or petroleum hydrocarbon resin is prepared from an aqueous emulsion polymerization of a liquid monomer mixture having the resin dissolved therein. The resin has a weight average molecular weight of from about 500 to about 5000, an aromatic content of at least 10 percent by weight and is essentially free of chain transfer agent. The monomer mixture comprises (meth) acrylic acid and one or more of alkyl (meth) acrylate esters including from about 10 to about 100 parts by weight of the resin dissolved in 100 parts by weight of the monomers. The tackified copolymer product has a glass transition temperature (Tg) of from about $-70°$ C. to about $10°$ C., preferably from about $-60°$ C. to about $-10°$ C. The monomers, when polymerized without the tackifying resin dissolved therein, would otherwise produce a copolymer preferably having a Tg of from about $-75°$ C. to about $30°$ C., more preferably from about $-65°$ C. to about $-45°$ C. The hydrogenated hydrocarbon resin preferably has a softening point of from about $-20°$ C. to about $150°$ C., more preferably from about $10°$ C. to about $100°$ C., and is preferably free of antioxidant and allylic hydrogen.

The polymer latex, when coated onto a suitable substrate such as flexible polyester or polyolefin films dries into a pressure sensitive adhesive (PSA) tape or label having enhanced peel strength while maintaining shear properties, including high temperature shear properties.

In a preferred embodiment, the present invention comprises from about 1 to about 15 percent by weight, preferably from about 2 to about 6 percent by weight of a (meth) acrylic acid, from 0 to about 50 percent by weight, preferably from about 10 to about 35 percent by weight of a lower alkyl (meth) acrylate ester, from about 25 to about 99 percent by weight, preferably from about 60 to about 88 percent by weight of an upper alkyl (meth) acrylate ester and the resin tackifier in an amount of from about 20 to about 60 parts by weight per 100 parts by weight of the monomers. The hydrogenated resin tackifier has an weight average molecular weight of from about 500 to about 5000 and an aromatic content of from about 20 to about 65 percent by weight. The tackified copolymer product has a Tg from about $-70°$ C. to about $10°$ C., preferably from about $-60°$ C. to about $-10°$ C.

In another embodiment of the present invention, a method for preparing a tackified acrylic copolymer latex composition comprises the steps of: dissolving from about 10 to about 100 parts by weight of a hydrogenated hydrocarbon resin in 100 parts by weight of a liquid mixture of free radical polymerizable monomers to form a polymerizable vinyl monomer reactant solution essentially free of chain transfer agent, the hydrocarbon resin having an weight average molecular weight of from about 500 to about 5000 and an aromatic content of at least about 10 percent by weight; emulsifying the reactant solution in an aqueous medium; polymerizing the emulsified monomers, in the absence of oxygen and chain transfer agent, in the presence of the resin and a free radical polymerization initiator to form a high molecular weight acrylic copolymer latex, the tackified copolymer having a Tg from about $-70°$ C. to about $10°$ C., preferably from about $-60°$ C. to about $-10°$ C.; and recovering the acrylic copolymer latex internally tackified by the resin.

In a further embodiment, the present invention comprises a monomer mixture for preparing an internally resin tackified acrylic polymer comprising a mixture of lower alkyl (meth) acrylate, upper alkyl (meth) acrylate and (meth) acrylic acid. The polymerized and tackified monomer mixture has a Tg from about $-70°$ C. to about $10°$ C., preferably from about $-60°$ C. to about $-10°$ C. The hydrogenated resin is dissolved in an amount of from 10 parts to 100 parts by weight resin per 100 parts by weight of the monomer mixture with the monomer mixture as solvent. The resin has a weight average molecular weight of from about 500 to about 5000, an aromaticity of at least 10 percent by weight and is essentially free of chain transfer agent. The polymerizable monomer mixture may also contain one or more of acrylonitrile, vinyl acetate, vinylidene chloride, styrene and methylstyrene.

In a further embodiment, the present invention comprises a pressure sensitive adhesive film article comprising a substrate film having a coating of the internally resin tackified acrylic copolymer. The PSA comprises a hydrogenated hydrocarbon resin having a weight average molecular weight of from about 500 to about 5000, an aromatic content of at least 10 percent by weight and being essentially free of chain transfer agent, and an acrylic copolymer formed by free radical initiated polymerization of a monomer mixture. The monomer mixture comprises alkyl (meth) acrylate and (meth) acrylic acid monomers having dissolved therein from about 10 to about 100 parts of the resin per 100 parts of the polymerizable monomers. The tackified copolymer product has a Tg from about $-70°$ C. to about $10°$ C., preferably from about $-60°$ C. to about $-10°$ C. Substrates may be metallic, paper, plastic or cloth.

In yet another embodiment, the present invention is a laminating adhesive composition comprising a hydrogenated hydrocarbon resin having a weight average molecular weight of from about 500 to about 5000 and an aromatic content of at least 10 percent by weight, and an acrylic copolymer formed by free radical initiated polymerization of a monomer mixture essentially free of chain transfer agent. The monomer mixture comprises alkyl (meth) acrylate and (meth) acrylic acid monomers having dissolved therein from about 10 to about 100 parts by weight of the resin per 100 parts by weight of the polymerizable monomers. The tackified copolymer product has a Tg from about $-70°$ C. to about $10°$ C., preferably from about $-60°$ C. to about $-10°$ C.

In yet a further embodiment, the present invention is a laminate article comprising at least two layers of material bonded by an adhesive composition. The adhesive comprises a hydrogenated hydrocarbon resin having a weight average molecular weight of from about 500 to about 5000, an aromatic content of at least 10 percent by weight and being essentially free of a chain transfer agent, and an acrylic copolymer formed by free radical initiated polymerization of a monomer mixture in the absence of chain transfer agent. The monomer mixture comprises alkyl (meth) acrylate and (meth) acrylic acid monomers having dissolved therein from about 10 to about 100 parts by weight of the resin per 100 parts by weight of the polymerizable monomers. The tackified copolymer product has a Tg from about $-70°$ C. to about $10°$ C., preferably from about $-60°$ C. to about $-10°$ C.

DETAILED DESCRIPTION OF THE INVENTION

Resins useful in the present invention are generally well known and are defined as hydrogenated natural resins and thermoplastic petroleum hydrocarbon resins obtained by polymerization, in the presence of a catalyst of the Friedel-Crafts type, of steam-cracked petroleum distillates, boiling in the range between about $30°$ C. and 280° C., or any fraction of these distillates boiling within the said range, or of polymerized mixtures of olefins and diolefins.

The hydrocarbon resins useful according to this invention are preferably petroleum resins prepared by homo and copolymerization of olefins, diolefins, and vinyl aromatic components, predominantly the $C_5$ to $C_9$ species, from distillates of cracked petroleum stocks. The feedstocks for the resin must, however, have at least about 10 percent by weight vinyl aromatic constituents, such as, for example, styrenes, α-methyl styrene, indene and vinyl toluene and other well known vinyl aromatic compounds. A Frieder-Crafts catalyst is typically employed and this resin-forming polymerization is performed at temperatures which range generally from 0° C. to 70° C. and preferably from 30° C. to 55° C. The resulting resin is then hydrogenated in accordance with the methods described in U.S. Pat. Nos. 4,650,829; 4,328,090 and 4,629,766, for example, the disclosures of which are incorporated herein by reference in their entirety for all purposes. The resulting hydrogenated resin retains a ring and ball softening point in the range of −20° C. to about 150° C., preferably from about 10° C. to about 100° C. In the practice of this invention the pressure sensitive adhesives (PSAs) formed from resins having a softening point from 15° C. to about 40° C. typically find their best use as adhesives for laminant articles or adhesives for labels. Those PSAs utilizing resins having softening points from about 70° C. to 100° C. are typically used for tapes.

Broadly, hydrocarbon resins are polymerized from petroleum cracked distillates boiling in the range of about 30° C. to 280° C. or any fraction boiling within this range having a vinyl aromatic content as set forth above. As is well known, the resins are prepared by treating the distillate with from 0.25 to 2.5 percent by weight of a Friedel-Crafts-type catalyst such as aluminum chloride, aluminum bromide, boron trifluoride, and the like, or solutions, slurries, or complexes thereof. The reactions are conducted at temperatures in the range of 0° C. to 70° C., and preferably 30° C. to 55° C. Residual catalyst is quenched by suitable methods such as addition of methyl alcohol and subsequent filtration, water, and/or caustic washing. The final solution is then stripped of unreacted hydrocarbons and low molecular weight oils by vacuum or steam distillation. Properties of the hydrocarbon resins can be varied by changing conditions and feedstock as is well known.

The hydrocarbon resin is prepared by the hydrogenation of polymerized olefinically unsaturated monomers derived from petroleum cracking, preferably cyclic diolefin, such as, for example, dicyclopentadiene, styrene, α-methylstyrene and the like. Such resins, their preparation and hydrogenation are well known in the art, are commercially available under the trade designations of, for example, ESCOREZ, ARCON and the like.

Naturally occurring resins suitable for use in the present invention may be resin esters or terpenes such as α-pinene, β-pinene, carene, limonene or other readily available terpinous materials, α-pinene and limonene being preferred. The material may be pure or the commercially available concentrates such as gum terpentine or α-pinene concentrates, which tend to be mixtures of various terpinous materials. A suitable natural resin contains from about 70 to 95 percent by weight α-pinene, the remainder being other terpenes. Limonene and carene streams are available and are known to those in the art. These are typical streams useful in the present invention. The hydrogenation of these naturally occurring resins is well known and can be carried out using the procedures of the above-identified U.S. Patents.

It has been discovered in the practice of this invention that the most successful tackified acrylic copolymers are produced when the resin is readily soluble in the selected monomer mixture at ambient temperature. Such resin should have a weight average molecular weight of from about 500 to about 5000, preferably from about 1500 to about 2500.

When the aromatic content of the resin, usually a styrene or a vinyl toluene or vinyl xylene derivatives, decreases below about 30 percent by weight, the mixture of acrylic monomers must be adjusted to reduce overall polarity of the monomer mixture in a manner well known to those skilled in such polymerizations. For example, a substitution of butyl acrylate for 2-ethylhexyl acrylate would reduce polarity. By lowering the polarity of the monomer mixture, lower aromaticity in the resin can be tolerated and the resin will still dissolve in the monomers to form a solution.

Aliphatic resins, such as those formed from amylenes, piperylene, cyclopentadiene and its derivatives are generally not soluble in the monomers selected, and thus are normally not desirable.

In accordance with this invention, as previously mentioned, in order to form a suitable polymerization reaction mixture, it is necessary that the resins comprise from at least 10 to 100 percent by weight vinyl aromatic content, preferably from about 20 to about 65 percent by weight aromatic content with 30 to 50 percent by weight being a most preferred range.

In accordance with the present invention, the tackifier should not introduce any chain transfer agent into the monomer solution from which the adhesive is polymerized. The presence of chain transfer agent, in even minute quantities, adversely affects the improved peel strength without serious decrease in shear.

Accordingly, the tackifier should be essentially free of chain transfer agent, including for example antioxidants and allylic hydrogen. Antioxidants are typically present in commercially available tackifier, so care should be exercised in their selection and/or to remove the antioxidant prior to use. Allylic hydrogen also functions as a chain transfer agent, and its presence in the tackifier should also be avoided. While trace amounts of chain transfer agent may be tolerated, the monomer/tackifier solution should have a sufficiently low proportion of chain transfer agent to avoid severe molecular weight loss in the polymerized product.

Vinyl monomers used in the practice of this invention are those which are polymerizable by free radical reactions, preferably those materials generally described as acrylics, e.g. alkyl (meth) acrylates and (meth) acrylic acid and typically including a component from both (meth) acrylic acid and alkyl (meth) acrylate ester. The terms "acrylics" or "acrylic polymer" or "acrylic monomer" denote a generalized material comprising in greatest proportion either an α,β-ethylenically unsaturated carboxylic acid, a hydrocarbyl ester of an α,β-ethylenically unsaturated carboxylic acid or a mixture thereof. The term "(meth) acrylate" refers to either a methacrylate or an acrylate. The term "(meth) acrylic acid" refers to either methacrylic acid or acrylic acid. Mixtures of several different alkyl acrylates are usually included, affecting both the solubility of the petroleum resins prior to polymerization, as well as final properties of the copolymer composition. These acrylate monomer mixtures generally comprise lower alkyl (meth) acrylates having 1 to 3 carbon atoms, in the alkyl group of the ester and upper alkyl (meth) acrylates having four or more carbon atoms usually up to about 14 carbon atoms, but preferably from five to about eight carbon atoms. Another preferred monomer component is the (meth) acrylic acid.

Some preferred examples of acrylic monomers are as follows: acrylic acid, methacrylic acid, crotonic acid, maleic acid, itaconic acid, methyl (meth) acrylate, ethyl (meth) acrylate, propyl (meth) acrylate, 2-ethylhexyl (meth) acrylate, n-butyl (meth) acrylate. Other vinyl monomers which can be employed include acrylonitrile, vinyl acetate, vinylidene chloride, styrene, methyl styrene, and the like. The monomer mixture should contain from 1 to about 15 percent by weight, preferably about 2 to about 6 percent by weight of the (meth) acrylic acid; 0 to about 50 percent by weight, preferably about 10 to 35 percent by weight, lower alkyl (meth) acrylate; and from about 25 to 99 percent by weight, preferably from 60 to about 88 percent by weight upper alkyl (meth) acrylate. It should be noted that some acrylic monomer mixtures commercially available include minor amounts of acrylonitrile, styrene, or vinyl acetate, and the like.

For the preparation of the PSAs which are an embodiment of the present invention, the polymerized composition should have a suitable glass transition temperature (Tg). Accordingly, Tg is another important criterion for determining composition of the monomer solution in terms of monomer selection and concentration. Tg of the tackified copolymer product ranges from about −70° C. to about 10° C. for PSA application, preferably from about −60° C. to about −10° C. Compositional makeup of the monomer solution is preferably targeted so that a polymerized product in an absence of a tackifying resin would otherwise have a Tg in a range from about −75° C. to about −30° C., preferably from about −65° C. to about −40° C. If the glass transition temperature is too high, ambient temperature tackiness required for standard PSA applications is not generally obtained. The glass transition temperature is usually a function of the glass transition temperature of the component monomer homopolymers. Thus, to achieve the low Tg, it is generally necessary to avoid excessive amounts of high Tg monomers such as (meth) acrylic acid and lower (meth) acrylates, as well as the high Tg materials such as styrene, acrylonitrile and the like.

Generally the reaction of acrylic monomers to form acrylic copolymers proceeds by aqueous emulsion polymerization and is well known to those practitioners in the art. The process includes water to adjust the solids content of the emulsion and a surfactant to aid in the formation of monomer-in-water emulsion and to act as a suspending agent for the solids in the final copolymer, which are dispersed in the aqueous medium both during and after the polymerization. The surfactants useful in the practice of this invention are well known and are present in quantities sufficient to place the reactants in the emulsion prior to reaction and maintain the product in suspension after the reaction. Of particular applicability are a blend of anionic and nonionic surfactants having a HLB of from about 14 to 42, especially from about 35 to about 40. Especially preferred is the widely used disodium sulfosuccinate as an ionic surfactant and ethylene oxide adducts of nonyl phenol as nonionic surfactants. While the ranges of surfactants are well known, the amount will preferably range from about 1 to about 5 parts, normally 2 to 4 parts per 100 parts of the monomers, by weight. Also present in the reaction mixture is an initiator, such as, for example, sodium persulfate or an ammonium persulfate present in amounts well known to those skilled in the art, such as, for example, about 0.1 part per 100 parts of monomer in the reaction mixture. In some instances it may be advantageous to buffer the pH of the solution by including some well known buffering agent such as, for example, sodium bicarbonate.

Notwithstanding the foregoing, the selected petroleum or natural resin is dissolved into the selected monomers to form a solution containing from about 10 to about 100 parts resin per 100 parts of the liquid mixture of monomer reactants, and preferably from about 20 to about 60 parts per 100 parts of monomer reactants. Most preferably, from 25 to 55 parts resin per 100 parts of monomer reactants are present. As stated hereinbefore, the resin is selected so that it will be readily soluble in the monomer mixture at ambient temperatures, but notwithstanding such, the polymerization temperature could be raised to the point where it is easily solubilized, i.e., from about 25° C. to about 40° C.

The molecular weight of such copolymers is normally controlled by a commonly known monoolefin chain transfer agent in the polymerization mixture. In the practice of the present invention, as aforementioned, use of chain transfer agents causes undesired low molecular weight material and therefore should not be used. Similarly, as aforementioned, the presence of an antioxidant in the resin should be avoided because it also causes the same problem—low molecular weight polymer species. It is preferred that the solution of monomers and resins be dispersed into a water medium to form an emulsion at ambient temperatures just by stirring in the presence of a satisfactory surfactant. The reaction mixture thus formed, including the initiators, must be placed in a reaction vessel, evacuated of oxygen by purging with nitrogen, and the polymerization reaction conducted with stirring in the sealed container under a nitrogen blanket.

The addition of the monomer solution containing the hydrocarbon resin is normally carried out intermittently and over a period of time. For example, about 15 percent by weight of the monomer solution is initially metered into the reaction mixture and polymerized for a short period of time. Normally when this is accomplished, the solids content of the reaction should preferably be about 18 percent by weight, which is a benchmark solids content. Once the selected solids level is attained, the balance of the monomer solution is evenly metered into the reaction vessel over a period of time, usually 3 to 6 hours, depending upon the size of the reactor and quantity to be added. Once the addition of the monomer mixture is complete, the polymerization is allowed to continue, usually for about another hour while maintaining the reaction temperature within the range of from about 45° C. to about 90° C., preferably between about 50° C. and 80° C. The polymerization continues until the total solids content of the material in the reactor reaches its theoretical level based upon the amount of reactants charged to the reaction mixture, usually in practice about 45 to 55 percent by weight, but the overall solids content may be as high as 70 percent by weight, with no lower limit. While there is no theoretical lower limit, a practical lower limit of about 30 percent by weight solids content is recognized by those skilled in the art. In a commercial sense the highest limits attainable are preferred.

Once the reaction is complete, the solids, in the form of a dispersed polymer latex, is allowed to cool to room temperature and the dispersed polymer latex is usually separated from coagulum formed during polymerization by filtration. In the practice of this invention, a 200 mesh "sock" filter has been found satisfactory. The latex product can be coated on a substrate film for use as a tape, for example. The coated substrate is typically dried by circulating hot air at 100° C. to 110° C. for 2 to 5 minutes. Those skilled in the art readily recognize other processing parameters for such coated substrate.

The dried and cured latex coating produces an adhesive film suitable for PSA application. Suitable substrates include metallic, plastic, paper, cloth materials and the like. Examples of metallic substrates include aluminum, copper and steel and the examples of plastic substrates include polyesters, polyolefins, polyethylene terephthalate, and the like.

In certain embodiments of the practice of this invention, the adhesives formed find application as non-pressure sensitive adhesives such as, for example, laminating adhesives, binders for woven and nonwoven fabrics and binders for pressed wood production. For example, embodiments useful as laminating adhesives have high peel strength but low shear properties. Such adhesives can be used to join two or more sheets of material together such as joining a layer of wood or a multiple layer of wood to form a plywood product.

The foregoing invention having now been described, the following examples are to further teach the preferred embodiment and best modes for practicing the described invention and to aid others in the practice of the scope of such invention herein provided.

COMPARATIVE EXAMPLE 1

This example illustrates the synthesis of acrylic copolymer emulsions. The actual ingredients charged into the reactor are summarized in Table 1 below. Various amounts of the chain transfer agent, t-dodecanethiol, are used in the preparation of Samples 1–4, in order to obtain the copolymers with various molecular weight.

TABLE 1

| | A. Initial Charge: |
|---|---|
| 24.0 parts | distilled water |
| 0.1 parts | IGEPAL CO-850, an ethylene oxide adduct of nonyl phenol (sold by GAF) |
| 0.2 parts | sodium bicarbonate |
| 0.05 parts | sodium persulfate |
| | B. Monomer Mixture: |
| 24.2 parts | distilled water |
| 3.16 parts | EMCOL K-8300, an anionic surfactant (manufactured by Witco Chemical) |
| 0.05 parts | sodium persulfate |
| 37.5 parts | 2-ethylhexyl acrylate |
| 10.5 parts | ethyl acrylate |
| 2.0 parts | acrylic acid |
| 0–0.1 parts | 5-dodecanethiol |

A 2-liter, four-neck reaction flask equipped with a stirrer, condenser, a thermosensor, and a monomer addition tube was flushed with nitrogen for 15 minutes. The initial charge (A) was placed in the flask with stirring and continued nitrogen purging for additional 20 minutes. At the end of the 20 minutes, the temperature was raised to 65° C.

In a separate vessel, a monomer mixture according to the composition (B) was prepared. When the reaction flask temperature was equilibrated at 65° C., 15 percent by weight of the monomer mixture (B) was charged to the flask and allowed to polymerize for 30 minutes. The total solids at the end of the 30 minutes was 15–17 percent by weight. When the total solids reached this range, the remaining monomer mixture (B) was evenly metered into the flask over a period of three hours. After the monomer addition, the reaction was allowed to continue at 65° C. for two additional hours and then cooled to room temperature. Stirring was continuous throughout the procedures.

The final total solids was about 50 percent by weight, particle size, 150–250 nm, and Brookfield viscosity, 500–1000 cp. The coagulum content of about 2 percent of the total reactants charged was removed by filtration.

PSA Performance Test

The polymer latex prepared as described above was knife-coated on a Mylar film and dried in an air circulating oven for three minutes at 110° C. The dried adhesive coating was approximately 1.5 mils thick. The adhesive was bonded to a stainless steel surface for PSA performance tests. Peel (180° C.) adhesion was obtained using Test No. PSTC-1 of the Pressure Sensitive Tape Council. Shear test was performed using PSTC-7. SAFT test was similar to shear test except that the test temperature is increased at the rate of 10° F. per 15 minutes. The temperature at which shear failed is reported as SAFT. Both SAFT and shear were tested at 1 square inch and 1000 gram hang weight.

PSA performance is very sensitive to the molecular weight of the polymer. A chain transfer agent such as t-dodecanethiol is commonly used to control the molecular weight and to demonstrate the sensitivity. Table 2, below, summarizes the PSA test results for Samples 1–4 which were synthesized according to the above procedures, but with varying amounts of chain transfer agent.

TABLE 2

| SAMPLES | DODECANE-THIOL | 180° PEEL | SAFT | SHEAR |
|---|---|---|---|---|
| 1 | 0.0 | 1.1 | 290+ | 100+ |
| 2 | 0.025 | 1.1 | 290+ | 100+ |
| 3 | 0.05 | 1.6 | 290+ | 18 |
| 4 | 0.075 | 1.7 | 112 | 3 |

Samples with t-dodecanethiol level higher than 0.075 parts show cohesion failure in the peel test and have very poor shear, less than one hour. These samples are not useful for PSAs.

COMPARATIVE EXAMPLE 2

The Sample 1 from Table 2 was mixed with 20 to 100 parts of resin emulsion ECR-109A (Exxon Chemical Company, Houston, Texas) per 100 parts of an acrylic copolymer emulsion. The resin emulsion ECR-109A is made by direct emulsification of the hydrocarbon resin and contains 55 percent by weight total solids. The PSA performance results of the acrylic emulsion and resin emulsion blend are summarized in Table 3 below.

TABLE 3

| SAMPLE | ECR-109A LEVEL (PHR) | 180° PEEL (lb/in) | SAFT (°F.) | SHEAR (hrs) |
|---|---|---|---|---|
| 5 | 0 | 1.1 | 290+ | 100+ |

TABLE 3-continued

| SAMPLE | ECR-109A LEVEL (PHR) | 180° PEEL (lb/in) | SAFT (°F.) | SHEAR (hrs) |
| --- | --- | --- | --- | --- |
| 2 | 20 | 1.6 | 290+ | 88+ |
| 3 | 50 | 2.2 | 290+ | 36 |
| 4 | 100 | 2.6 | 221 | 18 |

EXAMPLE 3

The synthesis procedures described in Example 1 were followed using initial charge and monomer emulsion compositions of Table I, except that the monomer composition for the Samples 5–8 were changed to include different amounts of petroleum resins (ESCOREZ ECR-149, MW-1000, 50 percent by weight aromatics—Exxon Chemical Company, Houston, Tex.) dissolved in the monomer solution as illustrated in Table 4 below (all ingredient units are in parts by weight). No chain transfer agent was used. ECR-149 has a weight average molecular weight of about 1000, 50 percent by weight aromaticity and similar structure and softening point to the starting resin emulsion ECR-109A. It is obtained by the hydrogenation of the starting resin of ECR-109A.

TABLE 4

| SAMPLE | ECR-149 | ACRYLIC ACID | ETHYL ACRYLATE | 2-ETHYL-HEXYL ACRYLATE |
| --- | --- | --- | --- | --- |
| 9 | 10.0 | 1.6 | 8.4 | 30.0 |
| 10 | 11.6 | 2.3 | 7.7 | 28.4 |
| 11 | 11.6 | 1.5 | 8.1 | 28.8 |
| 12 | 15.0 | 1.4 | 7.4 | 26.2 |

The PSA performance results of above samples obtained following same procedures and at same conditions are summarized on Table 5 below.

TABLE 5

| SAMPLE | 180° Peel (lbs/in) | SAFT (°F.) | SHEAR (hrs) |
| --- | --- | --- | --- |
| 9 | 1.6 | 290+ | 100+ |
| 10 | 2.4 | 290+ | 100+ |
| 11 | 2.5 | 290+ | 26 |
| 12 | 3.1 | 188 | 22 |

Comparing the results in Table 4 with Table 2, it is clear that a significantly higher peel strength PSA product can be developed while maintaining high shear properties. The improved balance of peel and shear properties cannot be obtained through conventional acrylic composition using externally introduced tackifier as shown in Example 2.

EXAMPLE 4

To demonstrate the applicability of this invention to a wide range of hydrogenated resins having greater than 10 percent by weight aromaticity and a wide range of softening points, the preparation and PSA performance testing procedures of Examples 1 and 3 were followed. The results of these experiments are shown in Table 6.

TABLE 6

| SAMPLE NUMBER | RESIN USED | SOFTENING POINT (°C.) | RESIN LEVEL (PHR) | PEEL (lbs/in) | SAFT (°C.) | SHEAR (hrs) |
| --- | --- | --- | --- | --- | --- | --- |
| 13 | (NONE) | — | 0 | 1.1 | 290+ | 100+ |
| 14 | ECR[2] 426-36 | 36.6 | 40 | 5.2[1] | 105 | 1.9 |
| 15 | ECR 424-37 | 19.5 | 40 | 4.1[1] | 104 | 1.3 |
| 16 | ECR 143-1D | 90.5 | 30 | 2.3 | 300+ | 37 |
| 17 | ECR 149-1D | 90.5 | 40 | 2.6 | 253 | 100+ |
| 18 | ECR 149-1D | 90.5 | 50 | 2.8 | 266 | 100+ |
| 19 | ECR 149-BPC | 87 | 30 | 2.8 | 244 | 100+ |
| 20 | ECR 149-BPC | 87 | 40 | 2.7 | 136 | 71 |
| 21 | ECR 149-BPC | 87 | 50 | 3.3 | 128 | 40 |
| 22 | ECR 149-BPC | 87 | 50 | 2.5 | 253 | 100+ |
| 23 | ECR 149 | 95 | 25 | 1.6 | 290+ | 100+ |
| 24 | ECR 149 | 95 | 30 | 2.7 | 300+ | 26 |
| 25 | ECR 149 | 95 | 40 | 3.1 | 188 | 22 |
| 26 | FORAL[3] | 104 | 40 | 2.1 | — | 0.4 |
| 27 | STAYBELITE[4] | 83 | 40 | 5.4[1] | — | 0.3 |

NOTES FOR TABLE VI:
[1]Cohesive Failure.
[2]ESCOREZ Resins (Exxon Chemical Company). Aromaticity, wt. %: ECR 424-30% ECR 149-50%
[3]FORAL 105-P (Hercules Chemical Company) - contains antioxidant.
[4]STAYBELITE ESTER 10 is the glycerol ester of hydrogenated resins (Hercules) - contains antioxidant.

As seen by the foregoing Table 6, resins having softening points from about 19.5° C. to about 104° C. can be used in the practice of this invention. As a general consideration, resins having softening points between 70° C. and 100° C. are especially adaptable for use with tapes while those in the 15° C. to 40° C. range are considered preferable for labels. For instance, the PSA performance of samples 14 and 15 indicates that they would be good products for use as labels. Samples 26 and 27, though having high softening points, still result in low shear strength due to the minor amount of antioxidants present in the commercial resin product used. The presence of the antioxidant lowers the molecular weight of the finished products and results in weak shear strength. While not adequate for use as a pressure sensitive adhesive for a tape, it would make an adequate laminating adhesive or label adhesive.

COMPARATIVE EXAMPLE 5

Twenty parts ESCOREZ 5300, a hydrogenated petroleum resin, was mixed into a monomer mixture of 40 parts methyl methacrylate, 56 parts ethyl acrylate and 4 parts acrylic acid (all by weight) and found to be insoluble. Instead, a suspension of resin particles in the monomers was obtained.

As is apparent from the foregoing description, the materials prepared and the procedures followed relate to specific embodiments of the broad invention. It is apparent from the foregoing general description and the specific embodiments that, while predictive forms of the invention have been illustrated and described, various modifications can be made without departing from the spirit and scope of this invention. Accordingly, it is not intended that the invention be limited except by the appended claims.

I claim:

1. A method for preparing a tackified acrylic copolymer latex composition which comprises the steps of:
    dissolving from about 10 to about 100 parts by weight of a hydrogenated hydrocarbon resin in 100 parts by weight of a liquid mixture of free-radical polymerizable monomers to form a polymerizable vinyl monomer reactant solution essentially free of chain transfer agent, the hydrocarbon resin having a weight average molecular weight of from about 500 to about 5000 and an aromatic content of at least about 10 percent by weight;
    emulsifying the reactant solution in an aqueous medium;
    polymerizing the emulsified monomers, in the absence of oxygen and chain transfer agent, in the presence of the resin and a free radical polymerization initiator, to form an acrylic copolymer latex; and
    recovering the tackified acrylic copolymer latex internally tackified by the resin.

2. The method of claim 1, wherein the hydrogenated hydrocarbon resin is a natural resin or terpene essentially free of antioxidant and allylic hydrogen.

3. The method of claim 1, wherein the hydrogenated hydrocarbon resin is a petroleum hydrocarbon resin essentially free of antioxidant and allylic hydrogen and having a softening point of from about −20° C. to about 150° C.

4. The method of claim 1, wherein the monomers polymerized comprise from 1 to about 15 percent by weight of a (meth) acrylic acid, 0 to about 50 percent by weight of a lower alkyl (meth) acrylate ester and from about 25 to 99 percent by weight of an upper alkyl (meth) acrylate ester.

5. The method of claim wherein the monomers polymerized comprise from 2 to about 6 percent by weight of a (meth) acrylic acid, from about 10 to about 35 percent by weight of a lower alkyl (meth) acrylate and from about 60 to about 88 percent by weight of an upper alkyl (meth) acrylate.

6. The method of claim 1, wherein the resin has an aromatic content of from about 20 to about 65 percent by weight and the monomers polymerized include 2 to 6 percent by weight acrylic acid, 10 to 35 percent by weight ethyl acrylate and 60 to 88 percent by weight 2-ethylhexyl acrylate, and wherein the resin is present in the polymerization solution in an amount of from 25 to about 55 parts by weight per said 100 parts of said monomers.

7. The method of claim 1 wherein the emulsifier is a blend of anionic and nonanionic surfactants having an HLB from about 14 to 42.

8. The method of claim 7 wherein the emulsifier is a blend of disodium sulfosuccinate and ethylene oxide adducts of nonyl phenol.

* * * * *